No. 826,600. PATENTED JULY 24, 1906.
E. H. OAKMAN.
POULTRY HOUSE.
APPLICATION FILED JAN. 9, 1906.
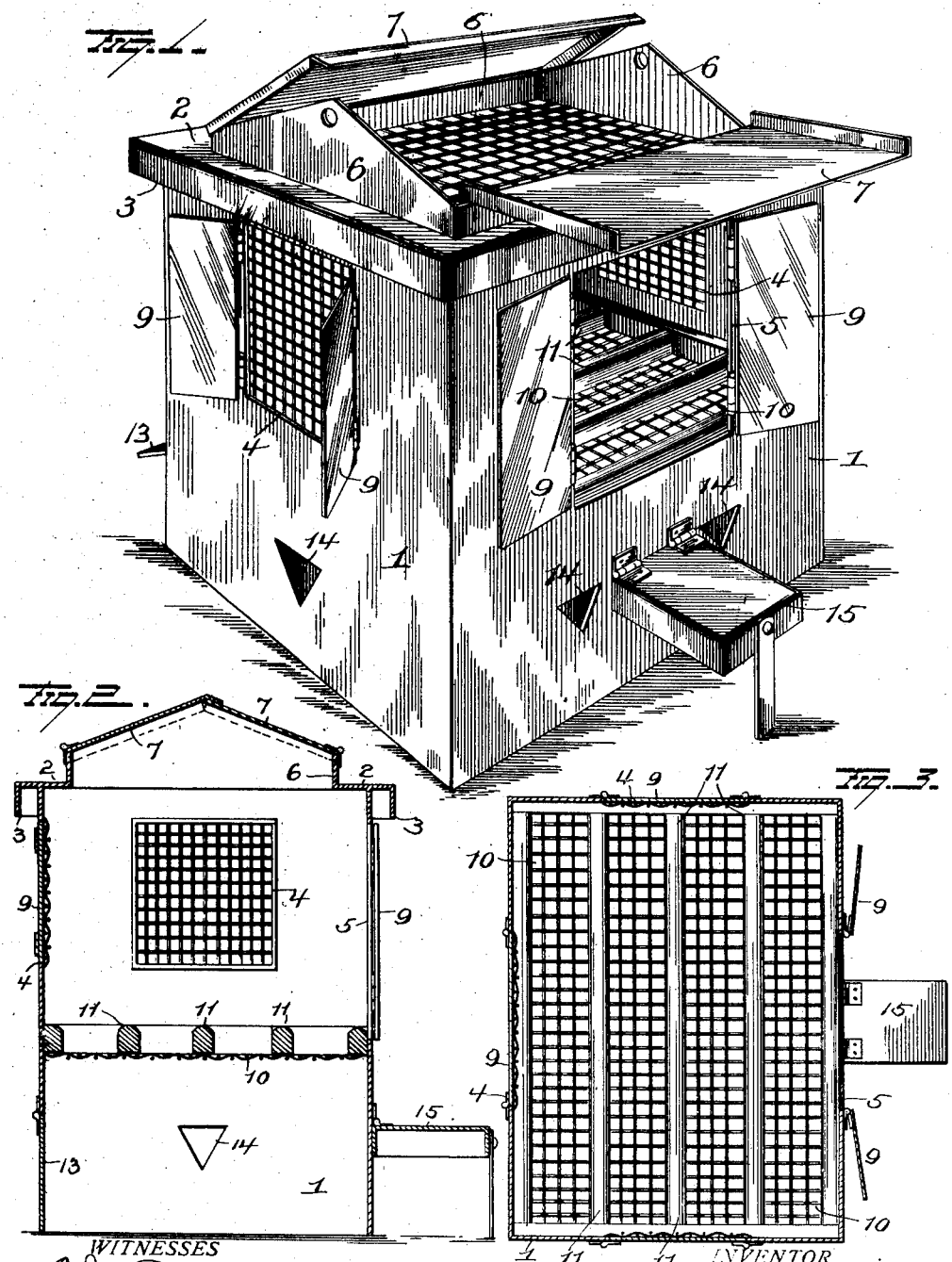

UNITED STATES PATENT OFFICE.

ERWIN HARRIS OAKMAN, OF ATLANTA, GEORGIA.

POULTRY-HOUSE.

No. 826,600.

Specification of Letters Patent.

Patented July 24, 1906.

Application filed January 9, 1906. Serial No. 295,303.

*To all whom it may concern:*

Be it known that I, ERWIN HARRIS OAKMAN, a resident of Atlanta, in the county of Fulton and State of Georgia, have invented certain new and useful Improvements in Poultry-Houses; and I do hereby declare the following to be a full, clear, and exact description of the invention, such as will enable others skilled in the art to which it appertains to make and use the same.

My invention relates to improvements in poultry-houses, the object of the invention being to provide a portable structure which will house a large number of fowls in comparatively small space, which will be clean and sanitary, which can be opened to expose the interior to the rays of the sun, and which is at all times thoroughly ventilated, and yet can be made perfectly tight to protect the poultry from the weather.

A further object is to provide a structure of this character in which the droppings from the fowls will fall through a perforated or false bottom onto the ground, from which they can be easily removed and where they are entirely out of contact with the fowls in the house.

With these and other objects in view the invention consists in certain novel features of construction and combinations and arrangemnts of parts, as will be more fully hereinafter described, and pointed out in the claims.

In the accompanying drawings, Figure 1 is a perspective view illustrating my improvements, and Figs. 2 and 3 are views in section thereof.

1 represents my improved poultry-house, which is preferably constructed of sheet metal; but I do not confine myself to such material. The roof 2 is made with an overhanging portion 3 all around to direct away the water from the windows or ventilator-openings 4 and doorway 5, and the roof is made with a large central opening suitably boxed, as shown at 6, to support inclined doors 7, one overlapping the other when closed and both made with flanged ends to overlap the boxing 6 and make a tight roof when the doors are closed, yet when they are opened they allow a free circulation of air and admit the sun's rays to the interior of the house.

The windows or ventilator-openings 4 are preferably covered by a wire-netting, and the doorway 5 as well as the windows 4 are provided with hinged doors or shutters 9 to close the openings as occasion may require.

In a horizontal plane below the bottom of doorway 5 a false bottom or floor 10 of wire-netting is located, and a frame of roosting rods or poles 11 are located above this floor 10, and as it is not necessary to provide sufficient space between the rods to permit the fowls to fly up between them, as is the case with similar houses on the market, a much larger number of rods may be located in the house, and hence a larger number of fowls can be accommodated in the same size of house than heretofore. Droppings from the fowls will fall through the floor 10 onto the ground, and the back wall of the house is made with a hinged section 13 to enable the keeper to readily clean out the droppings from the ground beneath the floor, and this construction keeps the fowls separated from the droppings, which is a great improvement in the art.

Ventilator-openings 14 are provided in the walls of the house to permit a free circulation of air, and a step 15 is hinged to the house and can be swung up out of the way when it is desired to pack or fold the same into its smallest compass.

A portable house of this character is of great advantage, as it enables those who rent property to move the poultry-house with them from place to place. The house constructed in the sanitary manner above explained keeps the poultry free from lice and vermin, as its thorough ventilation, cleanliness, and capability of interior exposure to the sun's rays all combined produce this much-sought result.

Slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. A poultry-house having a doorway therein, and roosting-rods located in a plane approximating the bottom of the doorway and an open-work floor under said roosting-rods and above the bottom of the house.

2. A poultry-house having a doorway in its wall above its bottom, an open-work floor below the doorway, roosting-rods over the floor so that the droppings will fall through the floor onto the ground, and a movable section permitting access to the ground below the floor.

3. A poultry-house having screened ventilating-openings, a screen-top, means for closing said top, a screen-floor in the house above the bottom thereof, and roosts disposed between the screen-floor and the screen-top.

4. A poultry-house having screened openings therein, and a doorway located above the bottom of the house, roosting-rods in the house about the same plane as the bottom of the doorway, shutters or doors for the screened openings and doorway, an open-work floor under said roosting-rods and a hinged door in the wall of the house below the open-work floor.

5. A poultry-house having an open top, a closure for said opening, a door in one wall of the house, an open-work ceiling under the open top of the house, an open-work floor, and roosting-rods between said open-work ceiling and open-work floor.

In testimony whereof I have signed this specification in the presence of two subscribing witnesses.

ERWIN HARRIS OAKMAN.

Witnesses:
LESLIE M. DAVIES,
J. H. LATHAM.